L. PAIGE.
Car Brake.
No. 14,515.  Patented Mar. 25, 1856.
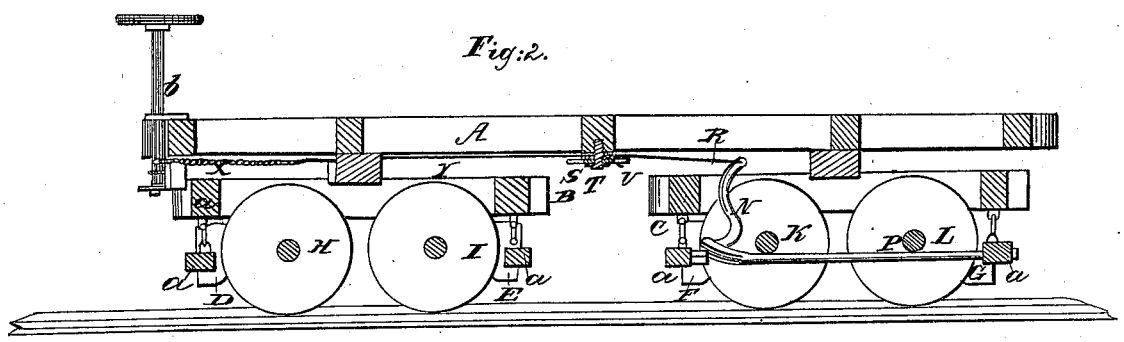
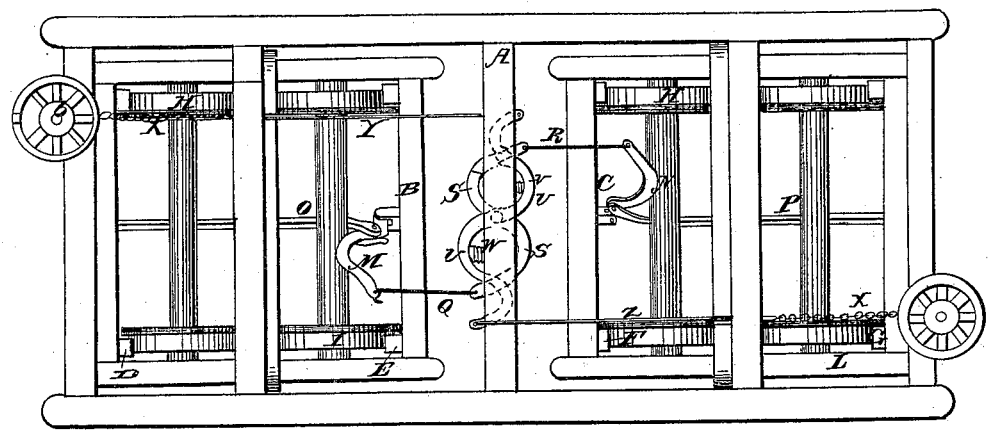
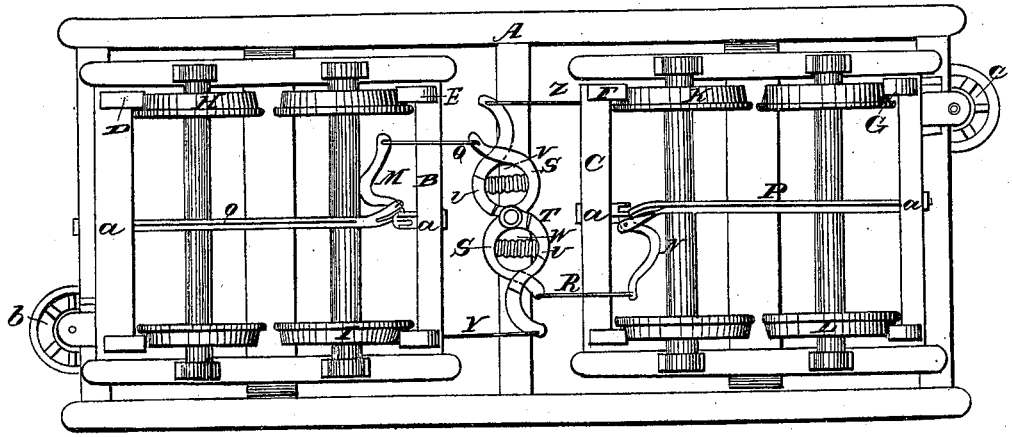

UNITED STATES PATENT OFFICE.

LUCIUS PAIGE, OF CAVENDISH, VERMONT.

LEVER OF RAILROAD-CAR BRAKES.

Specification of Letters Patent No. 14,515, dated March 25, 1856.

*To all whom it may concern:*

Be it known that I, LUCIUS PAIGE, of Cavendish, in the county of Windsor and State of Vermont, have invented a new and useful Improvement in Mechanism for Operating the Brakes of the Truck-Frames of an Eight-Wheel Railway-Car; and I do hereby declare that the same is fully described and represented in the following specification and the accompanying drawings, letters, figures, and references thereof.

Of the said drawings, Figure, 1, represents a top view of the platform and two truck frames of an eight wheel railway car having my improved brake apparatus applied thereto. Fig. 2, is a vertical, central and longitudinal section of the same. Fig. 3, is an underside view of it.

In the said drawings A denotes the platform of the car; B, C, the two truck frames; D, E, F, G, four sets of brakes, applied respectively to the four sets of wheels H, I, K, L, in the usual manner.

The brake bars a, a, of each truck frame are connected by one of two levers M N, and a connecting rod, O, or, P, arranged as seen in the drawings. The upper ends of the two levers, M, N, are connected by means of rods, Q, R, with the two opposite ends of a lever S, turning on a fulcrum, T. On the same fulcrum with the lever, S, is a longer lever, U, which is formed in the manner represented in the drawings and so that springs, V, W, may be interposed between it and the lever, S, as seen in the drawings. The two opposite ends of the longer lever, U, are respectively connected to the windlass or cord, X, X, by means of rods, Y, Z; the windlasses being shown at b, c, and situated at opposite ends of the frame or platform of the car, and in other respects as seen in the drawings. When either of the windlasses is turned in a direction to wind its cord upon it, draft is created on the lever, U. This draft acting through the springs, V, W, produces a draft on both the rods, Q, R, by which means the levers M, N, will be moved or operated in the usual way and so as to force the brake rubbers against the treads of the wheels.

In carrying out my invention, I have sought to avoid any use of elastic connecting rods, or chains or rods with springs so arranged on them that draft on them shall extend the springs. I have done this for the very obvious reason, that such springs are dangerous when so used in brake mechanism and particularly when there is frost in them. I have sought to employ the springs in such manner, that the power which sets the brake rubbers into action against their wheels, shall operate to contract the springs, and thus avoid much of that danger of breaking them which is incident to a spring, when such power expands or elongates it.

Being aware that it was common to make the arm of a lever as a spring, I have avoided the use of such a lever, because it would not only be dangerous in such mechanism but could not be employed to advantage, when used between two truck frames and connected with the two windlasses and the brake levers of the brakes of two truck frames. It will readily be seen that were both the arms of a lever (as used in the brake mechanism of Thompson and Bachelder) made as springs, the outer extremity of each being connected to a windlass chain, while the arm was also connected to a brake lever by a connecting rod, such spring lever would not operate successfully for when drawn upon by one windlass and the brakes connected with its arm so set up, no useful and further action or draft on the opposite arm of the lever could be effected. To produce such action a rigid lever must be employed and between it and the brake lever pulled by it there must be a yielding spring.

I have been aware that in other kinds of mechanism, a lever composed of two separate arms connected by a spring has been used. This does not constitute my invention, but only makes a part of it, as such a lever may be represented by the two arms S, and U, and the spring, V, placed on either side of the fulcrum, T. See Fig. 3, of the drawings. Two such levers arranged and connected together, as I connect them so as to form two other levers, operating on one common fulcrum and embracing the springs arranged on opposite sides of the fulcrum, and so embracing them that such springs during draft to set up the brakes operate by contraction, is an important feature in my invention or combination, other features being not only connecting the two arms of the longer lever U, U, to the windlass rods, Y, Z, but also connecting the shorter lever to the rods Q, R, of the brake levers of the two systems of brakes.

My invention has reference only to those railway carriages which are provided with two swiveling truck frames, carrying independent sets of brakes, and besides this it has reference to that system of brake mechanism in which all the brakes may be operated by either of the windlasses placed at opposite ends of the platform or body of a railway carriage.

My invention is one of great importance to a railway carriage of the above kind, and having such a brake mechanism, the said invention being simple, efficient in its operation and not liable to become deranged especially in frosty weather. It not only readily accommodates itself to the swiveling motions of the truck frames, but brings its springs into action at the proper time and causes both to operate simultaneously by contraction under draft on either windlass rod or chain.

What therefore I claim as my invention is the above described improved arrangement of levers and springs and their application to the brakes of a railway carriage having swiveling truck frames, the same consisting in arranging two levers S, S, U, U, so that they shall cross one another and work on one common fulcrum, applying springs between said levers and on opposite sides of the fulcrum respectively connecting both arms of the one, or the longer of said levers with the draft chain or rods of two windlasses situated at opposite ends of the carriage body or platform and respectively connecting the two arms of the other lever to the draft rod or chains of the brake levers.

In testimony whereof, I have hereunto set my signature this twentieth day of March A. D. 1855.

LUCIUS PAIGE.

Witnesses:
JOSIAH Q. ADAMS,
OTIS ROBBINS.